April 30, 1935.  W. R. ECKART  1,999,501
ATMOSPHERIC WATER COOLING TOWER
Filed May 8, 1934   2 Sheets-Sheet 1

INVENTOR
William R. Eckart

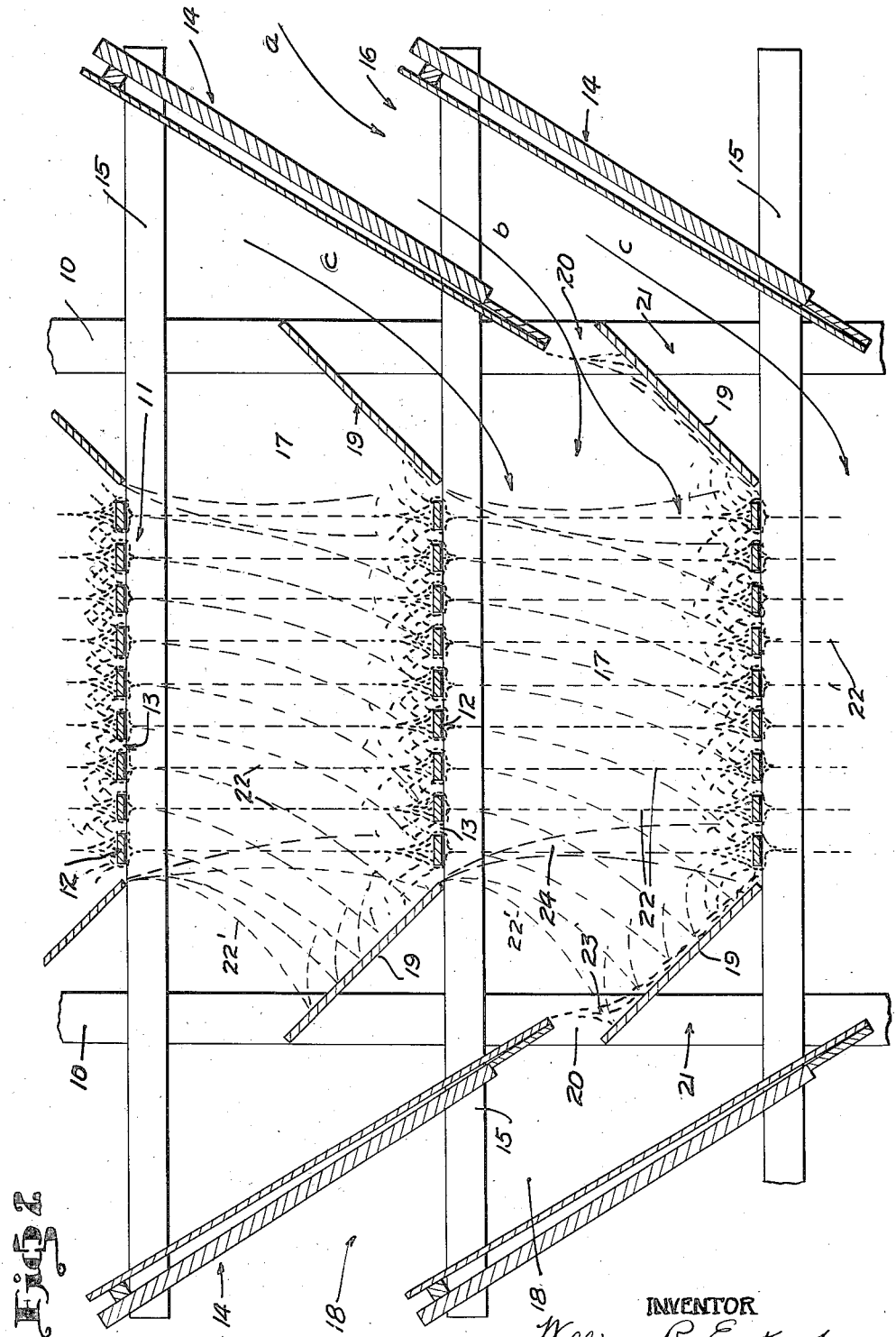

Patented Apr. 30, 1935

1,999,501

UNITED STATES PATENT OFFICE 1,999,501

ATMOSPHERIC WATER-COOLING TOWER

William R. Eckart, San Marino, Calif., assignor to C. F. Braun & Co., Inc., Alhambra, Calif.

Application May 8, 1934, Serial No. 724,538

7 Claims. (Cl. 261—113)

This invention relates to water cooling towers and particularly pertains to towers of the atmospheric type.

In the construction and operation of cooling towers of the atmospheric type such as are used in various commercial plants the structures normally embody the use of a plurality of superposed perforate cooling decks disposed in spaced relation to each other and in planes of progressive heights and horizontal alignment. The spaces occurring between adjacent cooling decks are bound along the perimeters of the cooling decks with upwardly and outwardly flaring louvers which are designed to decrease water loss by producing a controlled movement of air across and between the decks to and from the windward to the lee side thereof. In cooling towers of this construction water which is to be cooled is delivered to the top of the tower and distributed over the horizontal area thereof to thereafter flow by gravity downwardly through the perforate cooling decks, successively striking the same to produce a uniformly wetted surface of the decks and a maximum number of finely divided water particles and to create a downwardly moving column represented by a substantially uniform suspension of finely divided water particles. The object of this proceding is to obtain high efficiency of heat exchange between the water and the air through which it passes with a minimum water loss. An additional cooling action is also obtained due to contact of the air with the water on the wetted surfaces of the tower and the exposed surfaces of the water particles to insure a maximum cooling action and conservation of the moving column of water particles. In towers of usual construction these results are not always obtainable to a desired degree because the inclned louver arrangement, with imperforate louvers particularly, usually makes it necessary for transversely moving air currents to pass downwardly and inwardly through the throat formed by adjacent louvers and thereafter to be diverted by the lower cooling deck encountered to then move horizontally. The result is that the incoming transverse air stream will strike the upper surface of the lower cooling deck with considerable force and miss the under surface of the superadjacent cooling deck. Ths will cause the fine particles of water which have been disseminated by the impact of the water column with the lower cooling deck to be attacked and moved transversely of the column. The uniform distribution of particles throughout the area of the column will then be disturbed as well as the uniform creation of wetted surfaces on the cooling decks snce there will be a tendency to shift the entire column of downwardly falling water streams and particles. In many instances an appreciable water loss will occur since the fine mist of suspended water particles will be carried outwardly by the air current passing from the opposite side of the tower. And in cases of violent transverse air movement a porton of the water column at the lee side of the tower may be shifted horizontally until it fails to strike or fall upon the cooling deck. It is the principal object of the present invention to provide a cooling tower structure of the conventional type including horizontal perforate cooling decks and surrounding inclined louvers, but so designed as to insure against water loss in that the transverse air stream passing between adjacent cooling decks and louvers will flow in a streamline with substantially equal density and pressure throughout the space defined by the adjacent pairs of cooling decks and louvers, and whereby falling water particles will be arrested in lateral movement at the lee side of the tower and conducted back into the normal column flow, to produce a maximum and uniform cooling action with a resulting minimum loss of water.

The present invention contemplates the construction of a cooling tower of the general type shown in U. S. Letters Patent No. 1,794,394, and issued March 3, 1931, which structure is characterized by having superposed horizontal cooling decks and surrounding inclined louvers in connection with which in the present instance the perimeter of the horizontal cooling deck is bound by inclined cooling deck sections which extend upwardly towards the throat between adjacent louvers and above the planes of the horizontal cooling deck areas.

The invention is illustrated by way of example in the accompanying drawings in which:—

Fig. 2 is an enlarged view in transverse section through the cooling tower showing details of construction of the present invention and indicating the manner in which air currents are directed transversely of the tower.

Figure 1:
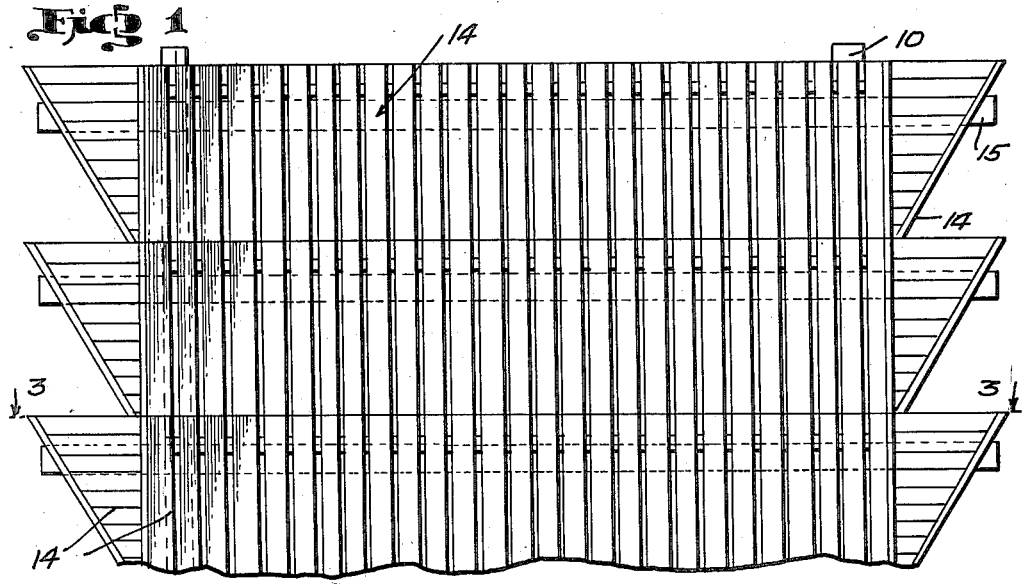
Fig. 1 is a view in side elevation showing a cooling tower with which the present invention is concerned.
Figure 3:
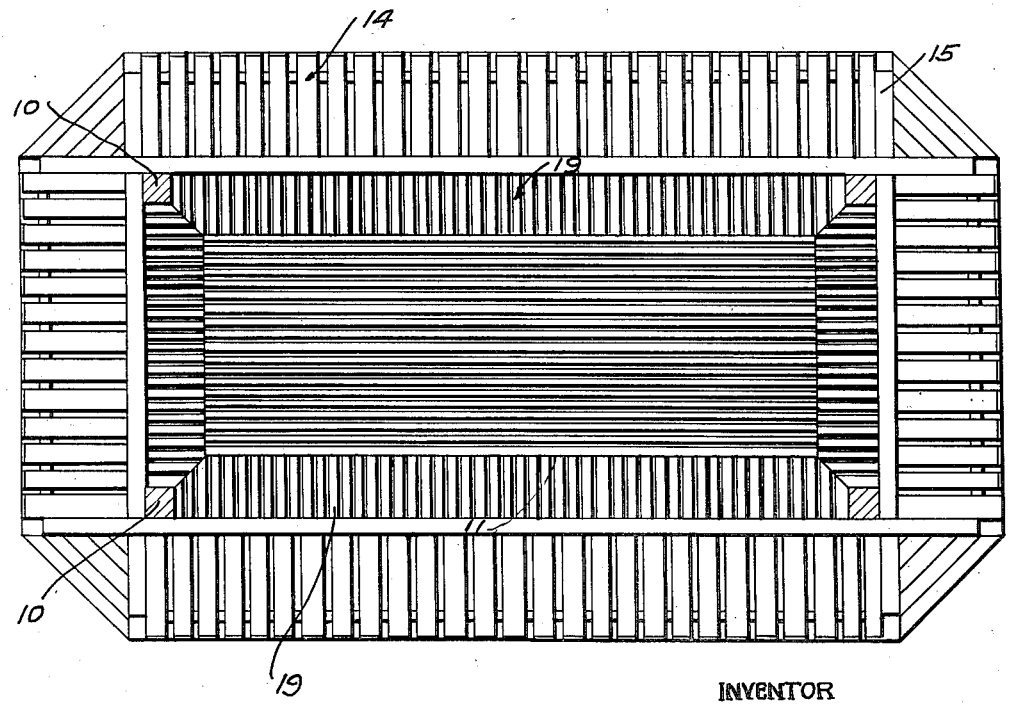
Fig. 3 is a view and plan showing the arrangement as seen on line 3—3 of Fig. 2.

Referring more particularly to the drawings, 10 indicates a series of uprights forming the frame structure of a cooling tower and by which perforate cooling decks 11 are supported. These decks are placed in spaced parallel and vertical relation to each other, and are normally constructed by the use of a plurality of wooden slats 12. This insures that the falling streams or curtains of water which pass through one series of openings 13 will encounter the slats 12 of the next lower cooling deck and will strike the same with sufficient impact to break the stream of water into relatively fine particles. These slats in the present case are relatively very narrow as compared to slats used normally in cooling decks and are spaced apart a slight distance to allow water and air to pass between them. It has been found that the capillary attraction of the water on the wetted surfaces of the slats causes the water thereon to migrate around this surface laterally and to accumulate on the under faces of the slats until in sufficient quantity to drop from the center of the under face of each slat. It will thus be evident that the narrower and closer together these slats are positioned the more uniform will be the subdivision and distribution of water by each deck.

Disposed around the edges of the cooling decks are inclined louvers 14. The innermost ends of these louvers terminate in substantially the plane of the cooling decks or in planes therebelow in accordance with the design of the tower. The outer ends of the inclined louver sections extend upwardly and outwardly and are supported by transverse frame members 15 upon which the cooling decks rest. The upper outer edges of the louvers therefore terminate substantially in the plane of a cooling deck above which the lower edge of the louver is disposed. By this arrangement it will be evident that an inclined throat 16 will be formed between adjacent louvers 14 on the windward side of a cooling tower and will communicate with a horizontal passageway 17 as defined by the space between adjacent cooling decks 11. The passageway will thereafter extend upwardly and outwardly along the inclined throat 18 between louvers 14 on the lee side of the tower. Since the inlet space between the louvers as defined by the upper edges of the louvers and the space between adjacent cooling decks is substantially the same it will be evident that in the usual cooling deck design an air stream will move transversely through the tower. This stream will be deflected away from the upper surface of a lower cooling deck where the direction of airflow would be changed. Violent action of the air stream will then occur in the zone of impact and rebound of the streams of the falling column of water and in which zone the water particles will be in their greatest degree of fineness. The water particles will thus be easily suspended in the transverse column of air and carried outwardly away from the column through throat 18 to produce a water loss. It will also be evident that due to the downward deflection of the transversely moving air stream there will be negligible contact of the air stream with the under wetted surface of the upper cooling deck and with the water particles of the falling column adjacent thereto whereby the maximum heat exchange would be lost in this area. It will also be seen that the transversely moving air streams will tend to shift the water streams on the lee side of the tower to such an extent as to cause a portion of the water column to fall beyond the perimeter of the decks.

In order to eliminate these objections and to obtain better results the cooling decks 11 in the present case are formed with novel upwardly and outwardly flaring deck sections 19. These sections are preferably perforate so that a lateral flow of air may pass through the inclined deck sections, and so that the transversely moving air currents may in some small measure move in a direction parallel to the horizontal surface of the cooling deck if desired without carrying the particles out of the zone of the falling water column. By reference to Fig. 2 of the drawings it will be seen that the inclined cooling deck sections extend upwardly and outwardly from the plane of the horizontal deck area and terminate at a point above and beyond the lower edge of an upper louver 14. This insures that an air throat 20 will occur between the upper edge of the inclined cooling deck section 19 and the lower edge of an upper louver and that an air throat 21 will occur between the upper outer edge of the inclined cooling deck section 19 and the lower edge of a lower louver 14 of a pair of louvers being considered. In this manner the volume of air flowing in through the throat 16 between louvers 14 will be divided into two transversely moving columns, one of which will pass downwardly and inwardly to impinge upon the upper surface of a cooling deck 11 and be deflected thereacross. The other division of the stream of air will form a column passing downwardly and under the cooling deck and adjacent thereto. The angular arrangement of the adjacent louvers and the interposed inclined cooling deck section is such as to insure that the velocity flow of the separate columns of air will be appropriate to the areas through which they pass and so that the velocity of the air stream passing through the throat 20 will be reduced to act with less violence upon the relatively fine particles of water which have been created by impact of the falling column with the cooling deck. It will also be evident that due to the angular relation of the louver and inclined cooling sections directional control of the transverse air streams may be established and maintained to insure that the wetted surfaces of adjacent cooling decks will be uniformly acted upon by the air streams, and that there will not be any undue violence in movement or deflection of either of the air streams to carry the suspended water particles from the column as a loss. The inclined deck sections 19 will also act as barriers to arrest the outward flow of the falling water column and to divert back within the confines of the cooling deck.

In operation of a cooling tower of the type and construction here shown it will be assumed that the right-hand side of the tower as indicated in Fig. 2 of the drawings is the windward side and that air will have its normal circulation vertically of the tower due to incidental draft, and that there will be a transverse flow of air from the windward to the lee side between each of the cooling decks. A desired volume of water is delivered to the top of the tower and onto a distributing deck which will distribute the volume of water over the horizontal area of the tower and will permit it to pass downwardly by gravity. As the water strikes the relatively narrow slats 12 of the cooling decks it will move laterally along the surface of the slats toward the opposite longitudinal edges thereof and then will follow the edge surfaces of the slats to the under faces thereof where it will accumulate in sufficient quantity to eventually fall therefrom in a relatively fine stream or curtain extending the length of the slats. It will be evident that due to this action the slats need not be wide but preferably of sufficient cross-sectional area to give them ridigity and to provide a wetted surface onto which the water may accumulate, and by which it may be caused to form into a series of relatively thin falling streams.

It will also be evident that the passageways occurring between adjacent slats need not have any great width other than that required to permit free circulation of the water and a free flow of air. By this particular deck arrangement it will be seen that a given volume of water will be divided into a greater number of small streams than has now been commonly contemplated and that incidental to this division the particles of water will be very fine throughout the column. The advantages of this are very evident for the finer the division of the water particles the greater the amount of wetted surface exposed to the air and the greater the cooling action. As these streams of water normally fall as indicated at 22 in Fig. 2 of the drawings, they will encounter the transversely moving stream of air entering the throat of the tower 16 between louvers 14 on the windward side as indicated by the arrow "a" in Fig. 2 of the drawings. This air stream will then be divided as it passes through throats 20 and 21 as indicated by arrows b. The air stream b passing through the throat 20 will pass under the lower edge of louver 14 and over the upper edge of one of the inclined cooling deck sections 19. This air stream will thus move downwardly along the upper face of the inclined cooling deck section 19 and then across the upper face of the lower cooling deck face of the pair of decks considered in Fig. 2 of the drawings. The change in the direction of the air stream b will thus be gradual and will be diverted to a substantially horizontal direction of flow as it moves across the column of falling water streams as indicated at 22. The air stream passing downwardly and inwardly as indicated by the arrow c will move along the under face of the inclined cooling deck section 19 and then will pass across the under face of the cooling deck. In this manner it will be insured that the upper and lower faces of each cooling deck will be encountered by the transversely moving air streams without creating any violent action which would tend to greatly deflect the vertical fall of water particles. When the air streams b and c reach the lee side of the tower they will be deflected upwardly between throats 21 and 22 and will then pass out between louvers 14. The inclined deck sections 19 will at the same time act to shield the water column against incoming and transversely moving air currents will minimize the volume of water particles which would otherwise splash from the deck and will tend to prevent the outgoing transverse air currents from carrying the water particles from the tower. The inclined deck sections 19 will also divert the laterally moving water particles and streams 22' back into the column of water as defined by the perimeter of the cooling deck.

Attention is directed to the fact that the lower ends of the louvers 14 extend inwardly and overhang the outer ends of the inclined deck sections 19. Thus if water particles are in any measure moved toward the lee side of the tower by the transverse air this water will accumulate upon the louvers and will drain downwardly therefrom falling across the throat 20 in a stream as indicated at 23. The water will then be entrained on the wetted surfaces of the slats of the inclined cooling deck sections 19 and will drain downwardly and inwardly to the edge of the horizontal deck section 19 where it will form in a relatively heavy stream indicated at 24. It will thus be seen that the perimeter of the horizontal area of each cooling deck will be bound by a relatively thick falling stream or curtain of water which will act as a barrier to prevent violent action of the transverse air currents and disturbance of the falling water column. This insures that the falling column of water passing directly through the horizontal section of the cooling decks will be disturbed in a minimum amount only by the transversely moving currents of air, particularly since the water particles forming the barriers will be of greater size than those in the finely divided spray falling from the decks. These fine particles will be to a great extent caught and held by the agglomerative action of the larger water particles, and that a maximum heat transfer between the air and water will take place with a minimum water loss.

It will thus be seen by the construction and arrangement here shown it is possible to obtain a greater degree of efficiency in operation and conservation of water by the use of the apparatus disclosed than has heretofore been possible.

While I have shown the preferred form of my invention as now known to me, it will be understood that various changes may be made in the combination, construction, and arrangement of parts by those skilled without departing from the spirit of the invention as claimed.

Having thus described my invention, what I claim and desire to secure by Letters Patent is:

1. A water cooling tower of the atmospheric type including superposed perforate decks spaced in parallel relation to each other, inclined louvers disposed in shielding positions around the perimeters of said decks and inclined deck sections extending upwardly and outwardly between the inner edges of said louvers at the edges of the decks dividing the air stream passing in between adjacent louvers into two air streams, one passing above and the other passing beneath a cooling deck.

2. A water cooling tower of the atmospheric type having a plurality of vertically spaced parallel perforate cooling decks, inclined louvers by which each deck is bound and which louvers flare outwardly from points adjacent the edges of one deck to points substantially in the plane of the next superimposed deck and inclined members projecting into the throat formed between adjacent louvers to divide the transversely moving air stream so that a portion of it will pass over a deck and another portion will pass beneath the deck.

3. A water cooling tower of the atmospheric type comprising a frame structure, a plurality of vertically spaced horizontally disposed perforate cooling decks carried thereby, inclined louver sections disposed around the tower at each deck whereby to shield the space between adjacent decks from transverse air currents, said decks being formed with a plurality of inclined cooling deck sections extending around their perimeter and projecting upwardly and outwardly to the end of the throat formed by the louvers whereby a transverse air stream will be directed substantially horizontally of the upper face of the cooling deck and a second transverse air stream will be directed substantially horizontally of the under face of the same cooling deck.

4. The structure defined by claim 3, wherein said inclined deck sections are perforate.

5. The structure as defined in claim 3, wherein said inclined deck sections extending from the plane of the deck and from a point inwardly of the lower edge of an upper louver to a point outwardly and beneath the lower edge of the same louver whereby entrained water from said louver may fall onto said inclined deck section.

6. A water cooling tower of the atmospheric type comprising a frame structure, a plurality of vertically spaced perforate cooling decks carried by the frame and disposed in spaced horizontal planes, each of said cooling decks being bound by outwardly and upwardly inclined louver sections forming inclined throats through which transverse air currents are directed downwardly and inwardly between adjacent louvers and then across the space between adjacent cooling decks, and inclined deflecting means disposed in the path of the stream of air being projected downwardly and inwardly between adjacent louvers to the cooling deck whereby the direction of flow of said stream of air may be changed with relation to the plane of the cooling deck.

7. A cooling tower comprising a frame structure, sets of inclined louvers disposed in successive horizontal planes around the perimeter of a rectangular area in the center of said tower, a series of cooling decks within said area, one of said decks being disposed in a plane adjacent the lower edge of each of said sets of louvers, said decks having upturned edge portions outwardly inclined to project into the throat between adjacent sets of louvers.

WILLIAM R. ECKART.